Oct. 25, 1927.
D. B. BROWN
1,647,077
RAKE
Filed Nov. 17, 1924
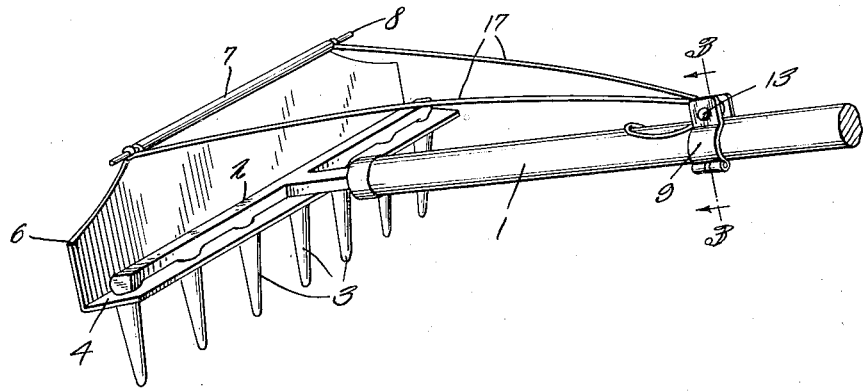
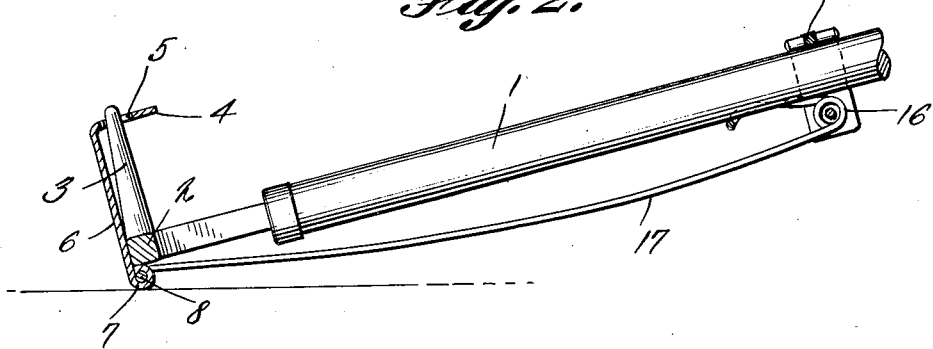
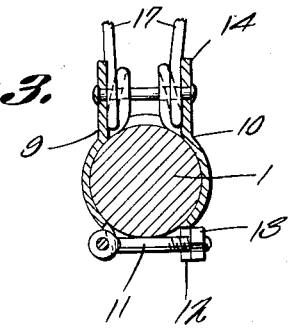
D. B. Brown,
INVENTOR
BY Victor J. Evans
ATTORNEY
WITNESS:

Patented Oct. 25, 1927.

1,647,077

UNITED STATES PATENT OFFICE.

DANIEL B. BROWN, OF DOVER, NEW HAMPSHIRE.

RAKE.

Application filed November 17, 1924. Serial No. 750,421.

The object is the provision of a tooth cleaning device for rakes characterized by simplicity in construction, ease in application and reliability and efficiency in practical use.

To the attainment of the foregoing, the invention consists in the improvement as hereinafter described and definitely claimed.

In the drawing:—

Figure 1 is a perspective view illustrating the application of the improvement.

Figure 2 is a side elevation, with parts in section, showing the manner in which the rake is reversely positioned in the tooth cleaning operation.

Figure 3 is a sectional view on the line 3—3 of Figure 1.

The rake is of any ordinary construction, the same including a handle 1 having attached to one end a head 2 that carries teeth 3.

In carrying out my invention, I make use of a plate 4, the same having spaced openings 5 therethrough for the reception of the teeth 3. On its outer edge the plate is bent, cast or otherwise formed with a flange 6, the same having its corners cut away and its outer edge rounded upon itself to provide a barrel 7 through which is inserted a pin 8.

On the handle 1 there is a clamp defining two members 9 and 10 respectively. On the member 9 there is hinged a bolt 11, the lower edge of the member 10 being formed with a depending lug 12 which is slotted for the reception of the bolt, and screwed on the bolt there is a nut 13 that contacts with the lug 12. The body of the clamp is rounded to conform to the cross sectionally rounded handle 1 and is from thence formed with upstanding ears 14. Passing through these ears there is a pivot member 15 that receives therearound the coiled portion 16 of a spring. The spring is preferably constructed of wire and has strands extending from the coil 16 to engage with the handle 1, and has other strands or arms 17 which are arched and which are hooked around the pin 8. By cutting away the corners of the flange 6 the hooked ends of the arched arms 17 of the spring are disposed below or inward of the outer circumference of the barrel 7, so that the said hooked ends of the spring arms will not be brought into ground contact when the rake is cleaned. It will be further noted that the barrel 7 offers a comparatively wide ground contacting surface.

In Figure 1, I have illustrated a rake in its operative position, while in Figure 2 it will be noted that the rake is turned upon itself so that the beaded or barrel end 7 of the flange 6 is brought into contact with the ground surface which moves the teeth through the openings 5 in the plate 4 and effectively cleans the said teeth.

Having described the invention, I claim:—

The combination with a hand rake, of a tooth cleaning means removably associated therewith, and comprising an angle plate having openings in the horizontal flange thereof for the passage of the teeth of the rake, the vertical flange of the plate having its corners cut-away and its upper edge rounded to provide a barrel, a pin passing through the barrel and extending through both ends thereof, and a two-arm spring secured on the handle and having hooked ends which are arranged around the respective ends of the pin to influence the horizontal flange of the angle plate into contact with the head of the rake.

In testimony whereof I affix my signature.

DANIEL B. BROWN.